Nov. 12, 1929.  J. O. PALMQUIST  1,735,442
TRAP NEST
Filed Feb. 3, 1926
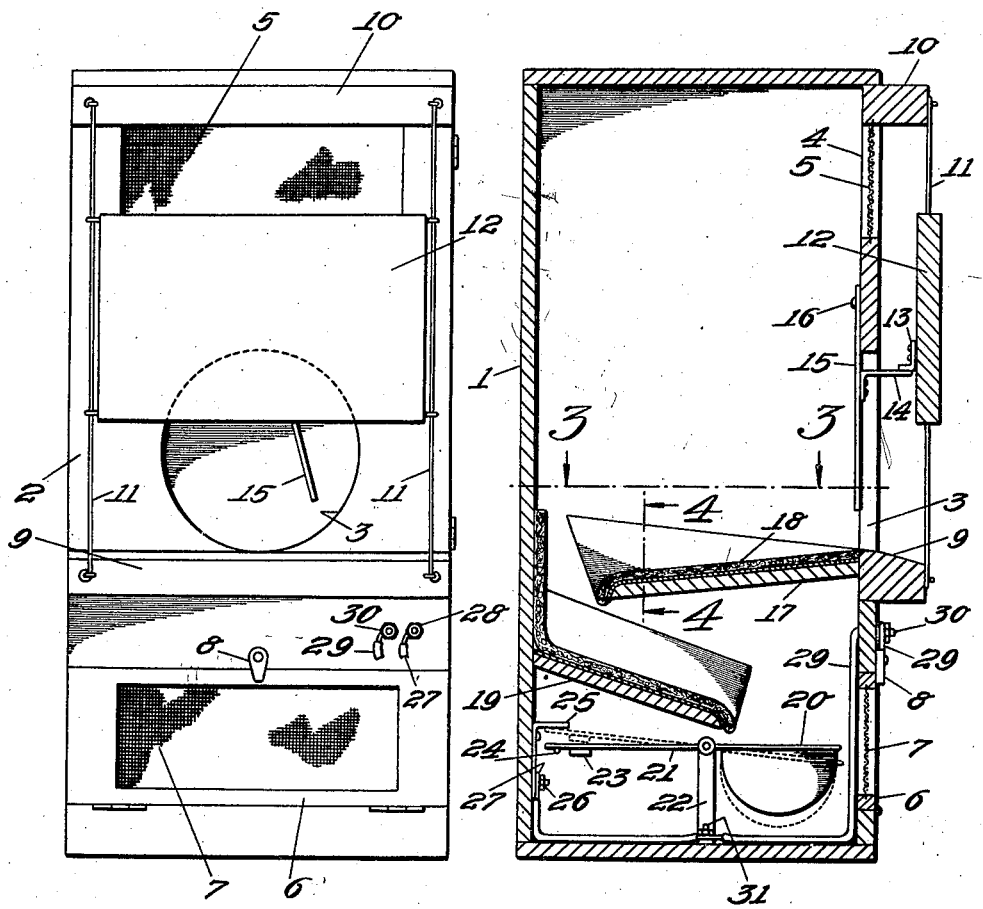
FIG. 1
FIG. 2
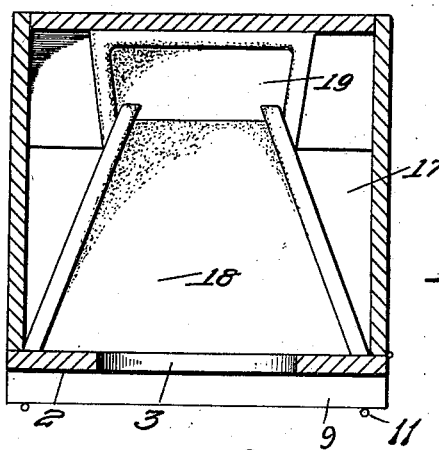
FIG. 3
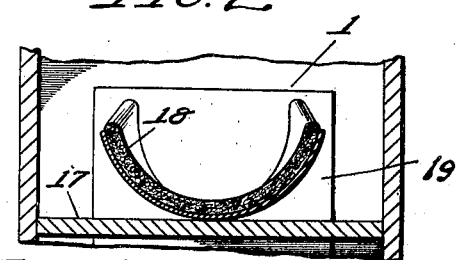
FIG. 4
INVENTOR:
J. O. Palmquist
BY H. J. Sanders
ATTORNEY.

Patented Nov. 12, 1929

1,735,442

UNITED STATES PATENT OFFICE

JOHAN OSCAR PALMQUIST, OF HAMILTON, ONTARIO, CANADA

TRAP NEST

Application filed February 3, 1926. Serial No. 85,706.

This invention relates to improvements in signalling trap nests of that type used for poultry and more particularly for laying hens for the purpose of keeping an accurate record of the egg product of each individual hen.

One object is to provide a device of this kind that is simple in construction, efficient in operation and cheap to manufacture.

With the foregoing and other objects in view the invention consists in the combination and arrangement of parts to be hereinafter fully described, pointed out in the appended claims and illustrated in the accompanying drawing which forms a part of this application and in which—

Fig. 1 is a view of the nest in front elevation.

Fig. 2 is a vertical sectional view through the nest.

Fig. 3 is a cross section on line 3—3 of Fig. 2.

Fig. 4 a vertical sectional view on line 4—4 of Fig. 2.

Like reference characters denote corresponding parts throughout the several views.

Poultry raisers have no accurate method of keeping individual egg records of their layers except through trap nests but the nests in general use serve only to trap the layers and require constant inspection on the part of an attendant in order to determine when any of the nests contain eggs and to then release the layers from such nests. This system requires too much time in the way of constant inspection and, in addition thereto, it disturbs layers on the nests.

The present invention requires but very little attention as the weight of an egg in a nest will close an electric circuit which, through the medium of a detector switch in the circuit and located in the attendant's house or at his desk will enable him, by closing the switch, to receive the signal denoting the presence of the egg.

The reference numeral 1 denotes the nest house in the front wall 2 of which is the entrance opening 3, the window opening 4 provided with the screen 5 and the hinged door 6 provided with the observation screen 7 and normally retained in closed position by the pivot latch 8. The sill 9 of the entrance 3 projects outwardly from the wall 2 as does the ledge 10 from the top of the window opening 4, said sill and ledge being connected by the guide rods 11, 11 that slidably carry the trap door 12 that is thereby spaced outwardly from the wall 2 and provided with the angular lug 13 adapted for releasable support by the finger 14 carried by the trigger 15 connected by pivot pin 16 to the said wall 2 whereby said trap door may be releasably supported in raised position to partially clear and afford access to the said entrance, said trigger 15 depending from its support into the entrance way.

Extending inwardly from the wall 2 flush with the sill 9 is the seat 17 for the layer, said seat being substantially trough shaped and sloping gently downward from said sill and being lined with a cushioning material 18, the inner free end of said seat being spaced away from and above the trough shaped downwardly sloping runway 19, also cushioned and secured to the rear wall of the house, the free end of said runway being spaced above the bowl 20 carried by the rod 21 fulcrumed upon the metal upright 22 supported upon the floor of the house, said rod 21 having a counterbalance weight 23 remote from the bowl to offset the weight of the same and to yieldingly retain the adjacent free end of said rod in engagement with the stop lug 24 carried by a side wall of the house, said rod being capable of engagement also with the metal contact 25 carried by the house and connected to the binder post 26 to which is secured one end of the conductor 27 that runs to the binder post 28 upon the front wall 2 of the house, an incoming conductor 29 leading from the post 30 leads to the binder post 31 carried by the said upright 22. An electric bell (not shown) in the circuit is arranged in the attendant's house and this bell will be sounded when an egg is dropped into the bowl from the runway 19 and seat 17, said egg causing the rod 21 and bowl 20 to assume the position shown dotted in Fig. 2 thus closing the electric circuit. A plurality of nests may be arranged in the circuit and by means of a hand switch the circuit between any given nest and the electric bell may be closed when that nest contains an egg thus instantly determining the exact location of the egg to the attendant from his "central" position in his house. This wiring arrangement is so common that it is not deemed necessary to illustrate it here.

In Fig. 2 the nest is shown ready for the hen to enter. As the layer passes through the entrance her body causes a slight movement of the trigger 15 on its pivot thus causing the finger 14 to move out of engagement with the lug 13 when the door 12 will drop through gravity thus blocking the entrance opening. When the attendant removes the egg from the bowl he will also remove the layer and re-set the trap door.

What is claimed is:—

1. In a trap nest, a housing having an entrance opening in one wall, a sill in said entrance opening extending outwardly from said wall, a ledge extending outwardly from said wall, guide rods connecting said sill and ledge, a trap door arranged upon said rods for opening and closing said entrance, a trigger pivotally suspended from said wall in said entrance opening and movable laterally thereof, and connection between said trigger and trap door whereby the latter is releasably supported in a predetermined position relative to said entrance opening.

2. In a trap nest, a housing having an entrance opening in one wall, a sill in said entrance opening extending outwardly from said wall, a ledge extending outwardly from said wall and spaced thereabove, vertically disposed parallel guide rods connecting said sill and ledge, a trap door slidably arranged upon said rods for opening and closing said entrance, a trigger pivotally suspended from said wall in said entrance opening and movable laterally thereof, the free end of said trigger being spaced above said sill, and connection between said trigger and trap door whereby the latter is releasably supported in a predetermined position relative to said entrance opening.

In testimony that I claim the foregoing as my own I have hereto affixed my signature.

JOHAN OSCAR PALMQUIST.